United States Patent
Lee et al.

(10) Patent No.: US 8,649,324 B2
(45) Date of Patent: Feb. 11, 2014

(54) DATA TRANSMISSION APPARATUS AND METHOD IN WIRELESS COMMUNICATION SYSTEM

(75) Inventors: Il-Gu Lee, Daejeon (KR); Hun-Sik Kang, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 304 days.

(21) Appl. No.: 12/884,625

(22) Filed: Sep. 17, 2010

(65) Prior Publication Data
US 2011/0069670 A1 Mar. 24, 2011

(30) Foreign Application Priority Data
Sep. 18, 2009 (KR) .................. 10-2009-0088537

(51) Int. Cl.
*H04W 4/00* (2009.01)
(52) U.S. Cl.
USPC ........................................ 370/328
(58) Field of Classification Search
None
See application file for complete search history.

(56) References Cited

U.S. PATENT DOCUMENTS

| | | | |
|---|---|---|---|
| 6,721,331 B1 | 4/2004 | Agrawal et al. | |
| 2002/0188723 A1* | 12/2002 | Choi et al. | 709/225 |
| 2004/0100936 A1* | 5/2004 | Liu et al. | 370/345 |
| 2004/0156336 A1* | 8/2004 | McFarland et al. | 370/329 |
| 2006/0034174 A1* | 2/2006 | Nishibayashi et al. | 370/235 |
| 2006/0092871 A1* | 5/2006 | Nishibayashi et al. | 370/328 |
| 2006/0104230 A1* | 5/2006 | Gidwani | 370/328 |
| 2006/0270339 A1* | 11/2006 | Mahany | 455/3.01 |
| 2007/0104162 A1* | 5/2007 | Kneckt et al. | 370/338 |
| 2007/0115877 A1 | 5/2007 | Zhen et al. | |
| 2007/0124443 A1* | 5/2007 | Nanda et al. | 709/223 |
| 2007/0232339 A1* | 10/2007 | Ji et al. | 455/502 |
| 2008/0089298 A1* | 4/2008 | Anschutz et al. | 370/338 |
| 2009/0059877 A1 | 3/2009 | Utsunomiya et al. | |
| 2009/0310578 A1* | 12/2009 | Convertino et al. | 370/338 |
| 2010/0046455 A1* | 2/2010 | Wentink et al. | 370/329 |

FOREIGN PATENT DOCUMENTS

WO    WO 2009/113834 A2    9/2009

OTHER PUBLICATIONS

Giuseppe Bianchi et al., "Performance Evaluation and Enhancement of the CSMA/CA MAC Protocol for 802.11 Wireless LANs", PIMRC, Oct. 15-18, 1996, pp. 392-396, vol. 2, IEEE.

* cited by examiner

*Primary Examiner* — Otis L Thompson, Jr.

(57) ABSTRACT

A data communication method in a basic service set (BSS) of a wireless communication system using a carrier sense multiple access with collision avoidance (CSMA/CA) protocol includes: performing, by first and second nodes within the BSS, communication within a predetermined first time period; and transmitting, by a third node within the BSS, data to a fourth node within the first time period through a channel which is not used by the other nodes.

12 Claims, 9 Drawing Sheets

DATA TRANSMISSION APPARATUS AND METHOD IN WIRELESS COMMUNICATION SYSTEM

CROSS-REFERENCE TO RELATED APPLICATIONS

The present application claims priority of Korean Patent Application No. 10-2009-0088537, filed on Sep. 18, 2009, which is incorporated herein by reference in its entirety.

BACKGROUND OF THE INVENTION

1. Field of the Invention

Exemplary embodiments of the present invention relate to a data transmission apparatus and method in a wireless communication system; and, more particularly, to a data transmission apparatus and method in a wireless communication system, which uses a carrier sense multiple access with collision avoidance (CSMA/CA) protocol as wireless LAN (WLAN) technology.

2. Description of Related Art

A WLAN standard which has been used the most so far is IEEE 802.11a/g. IEEE 802.11a stations operate in the 5 GHz range, and IEEE 802.11g stations operate in the 2.4 GHz range. The IEEE 802.11a/g WLAN standard may support a maximum data rate of 54 Mbps by modulating a signal through an orthogonal frequency division multiplexing (OFDM) scheme and transmitting the modulated signal at a bandwidth of 20 MHz. Recently, IEEE 802.11n standard has been established to improve throughput. The IEEE 802.11n standard is a high-speed wireless transmission standard which may expand a bandwidth to 40 MHz and may support a maximum data rate of 600 Mbps by using four antennas. The IEEE 802.11n standard should operate in both of the 2.4 GHz range and the 5 GHz range and should maintain backward compatibility with the IEEE 802.11a/g standard.

The WLAN standard uses the CSMA/CA scheme as a media access control (MAC) protocol. In the CSMA/CA scheme, stations connected to one network access point contend with each other to acquire a transmission opportunity for communicating with the access point. Furthermore, the CSMA/CA scheme is a transmission protocol in which a station acquiring the transmission opportunity in such a contention occupies a channel for a predetermined period.

During the period in which the station having acquired the transmission opportunity for accessing the access point occupies the channel, the other stations are switched into a low-power mode or wait in a receive mode until the transmission period of the station having acquired the transmission opportunity is terminated. That is, due to the protocol characteristic of the WLAN standard, only a specific station may communicate with the access point by using a given channel resource during a specific time, based on the competition and avoidance scheme using a back-off algorithm and a carrier sense algorithm. That is, stations which did not occupy the channel in the above-described contention should be in a standby state during a period in which carriers are sensed.

In terms of channel resource use efficiency, the conventional channel utilization method is not effective. The reason will be described as follows.

First, the WLAN standard has 12 channels in the 5 GHz range and seven channels in the 2.4 GHz range, based on a bandwidth of 20 MHz. Furthermore, the 60 GHz range under discussion in the current high-speed WLAN standard is expected to be utilized. It is not common that all the channels are always used for one basic service set (BSS). However, when a specific station occupies a channel, remaining channels are not used.

Second, as the number of stations in a BBS increases, the throughput efficiency of the conventional competition and collision avoidance scheme decreases due to overheads caused by a backoff time, an interframe space (IFS), and a packet header. When a relatively short packet is transmitted during the transmission opportunity period acquired through the contention among a plurality of stations and the channel occupation is terminated, the efficiency is further degraded.

Third, a station acquiring a transmission opportunity is determined on the basis of a simple backoff scheme, without reflecting a link performance with the access point during the transmission opportunity acquisition process. Therefore, when a station a having poor link performance with the access point occupies a channel, it may cause a reduction in the entire performance of the network.

SUMMARY OF THE INVENTION

An embodiment of the present invention is directed to a data transmission method and apparatus capable of increasing throughput in a wireless communication system in which stations acquire a transmission opportunity according to the CSMA/CA protocol.

Another embodiment of the present invention is directed to a data transmission method and apparatus capable of increasing channel/frequency use efficiency in a wireless communication system in which stations acquire a transmission opportunity according to the CSMA/CA protocol.

Another embodiment of the present invention is directed to a data transmission method and apparatus capable of increasing network efficiency during data transmission in a wireless communication system in which stations acquire a transmission opportunity according to the CSMA/CA protocol.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data communication method in a basic service set (BSS) of a wireless communication system using a CSMA/CA protocol includes: performing, by first and second nodes within the BSS, communication within a predetermined first time period; and transmitting, by a third node within the BSS, data to a fourth node within the first time period through a channel which is not used by the other nodes.

In accordance with another embodiment of the present invention, a data transmission method in a BSS of a wireless communication system using a CSMA/CA protocol includes: performing, by first and second nodes within the BSS, communication within a predetermined first time period; and receiving, by a third node within the BSS, data from a fourth node within the first time period through a channel which is not used by the other nodes, and storing the received data.

In accordance with another embodiment of the present invention, a data communication apparatus, which uses a CSMA/CA protocol in a node belonging to a BSS, includes: a reception unit configured to receive data to be transmitted to an access point from at least one node which does not communicate with the access point; a memory configured to store the received data; a transmission unit configured to transmit the data received from the at least one node to the access point; and a control unit configured to control the reception from the node which does not communicate with the access point, control the transmission unit and the reception unit to perform a procedure for communicating with the access point when communication between a specific node and the access point is terminated, and control the transmission unit to transmit the data stored in the memory to the access point.

In accordance with another embodiment of the present invention, a data communication apparatus, which uses a CSMA/CA protocol in a node belonging to a BSS, includes: a memory configured to store data to be transmitted and store channel information between an access point and the node; a transmission unit configured to transmit the data stored in the memory to the access point; and a control unit configured to select a node, when the access point communicates with a specific node, the memory contains data to be transmitted to the access point, and at least one or more nodes having a more favorable channel state than the channel state of the node belong to the BSS are determined on the basis of channel information between the access point and the nodes, and control the transmission unit to transmit the data stored in the memory to the selected node.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Before the exemplary embodiments of the present invention are described, a data transmission method adopted in the current WLAN standard will be examined on the whole. Hereafter, examples will be taken to define terms for explaining performance indicators of the WLAN technology and to facilitate the understanding.

MAC throughput is a value obtained by dividing a successful transmitted payload length by a total transmission time, and MAC throughput efficiency is a result obtained by dividing the MAC throughput by a physical layer (PHY) maximum data rate. At this time, MAC spectral efficiency of the MAC throughput is a value obtained by dividing the MAC throughput by a maximum available bandwidth. The MAC throughput, the MAC throughput efficiency, and the MAC spectral efficiency may be expressed as Equation 1 below.

$$MAC\ throughput = \frac{Successful\ transmitted\ payload\ length}{Total\ transmission\ time} \quad \text{Eq. 1}$$

$$MAC\ throughput\ efficiency = \frac{MAC\ throughput}{PHY\ Maximum\ data\ rate}$$

$$MAC\ Spectral\ efficiency = \frac{MAC\ throughput}{Maximum\ available\ bandwidth}$$

For example, the use efficiency of frequency resources in the IEEE 802.11n WLAN supporting a data rate of 270 Mbps through a 2×2 antenna configuration may be expressed as Equation 2 below.

$$MAC\ throughput = \begin{cases} 100\ \text{Mbps for } 11n\ \text{standard requirement} \\ 227\ \text{Mbps for theoritical limit} \end{cases} \quad \text{Eq. 2}$$

$MAC$ throughput efficiency =

$$\begin{cases} \frac{100\ \text{Mbps}}{270\ \text{Mbps}} = 37\%\ \text{for } 11n\ \text{standard requirement} \\ \frac{227\ \text{Mbps}}{270\ \text{Mbps}} = 84\%\ \text{for ideal condition} \end{cases}$$

$MAC$ Spectral efficiency over 2 channel =

$$\begin{cases} \frac{100\ \text{Mbps}}{20 \times 2\ \text{MHz}} = 2.5\ \text{bps/Hz for } 11n\ \text{standard requirement} \\ \frac{227\ \text{Mbps}}{20 \times 2\ \text{MHz}} = 5.68\ \text{bps/Hz for ideal condition} \end{cases}$$

$MAC$ Spectral efficiency over 4 channel =

$$\begin{cases} \frac{100\ \text{Mbps}}{20 \times 4\ \text{MHz}} = 1.25\ \text{bps/Hz for } 11n\ \text{standard requirement} \\ \frac{227\ \text{Mbps}}{20 \times 4\ \text{MHz}} = 2.84\ \text{bps/Hz for ideal condition} \end{cases}$$

Figure 1:
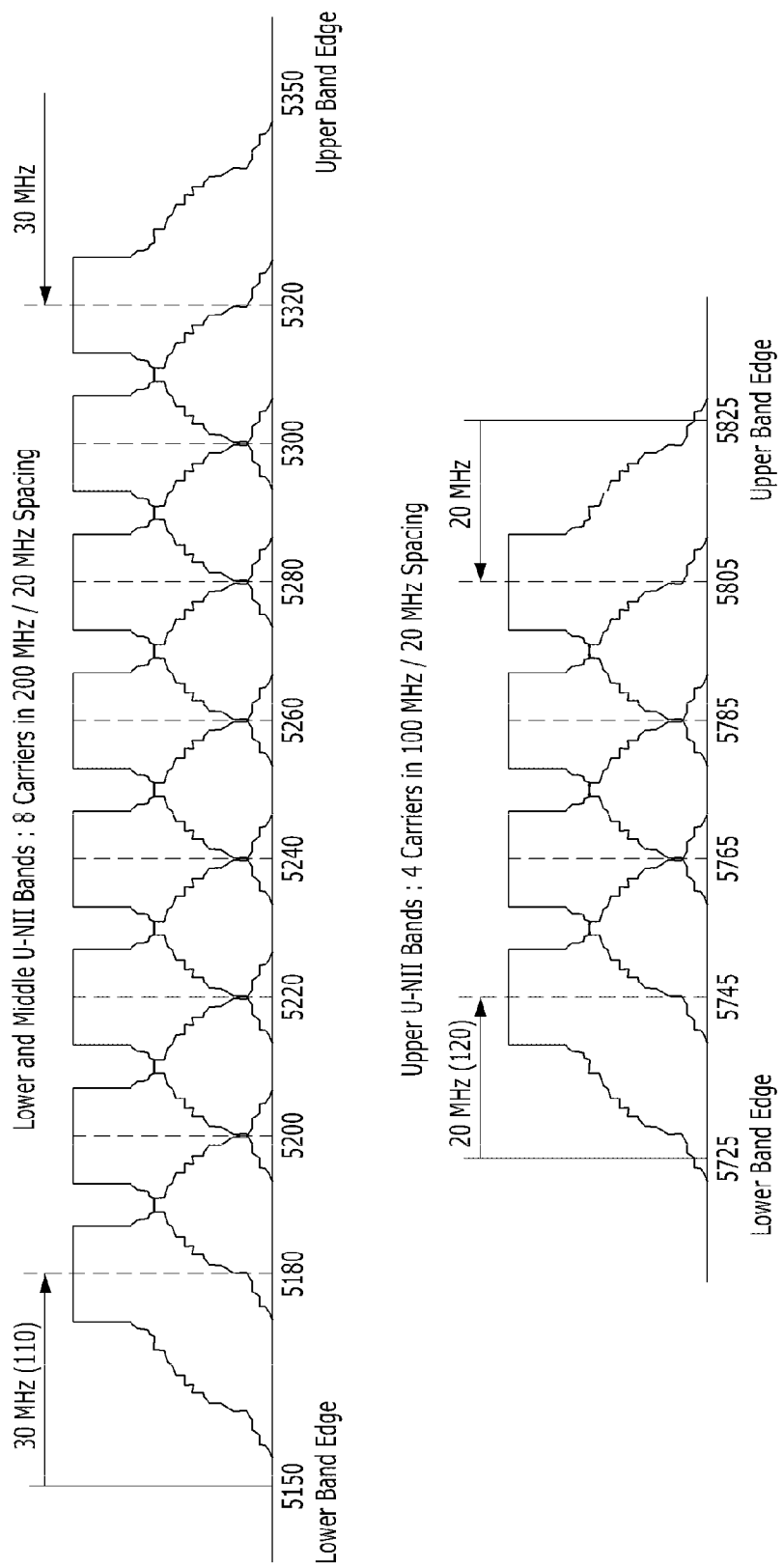
FIG. 1 is a diagram showing a case in which channels are allocated in the 5 GHz range in a WLAN system.

In order to facilitate the understanding, it is assumed that only one access point and five stations exist in the network and only the 5 GHz range defined in the WLAN standard of FIG. 1 is available.

FIG. 1 is a diagram showing a case in which channels are allocated in the 5 GHz range when only one access point and five stations exist in a WLAN system.

As shown in FIG. 1, a band has a 20 MHz bandwidth. At both edges of the band, that is, a lower band edge and an upper band edge, the bands have a 30 MHz (110) and 20 MHz (120) bandwidth for lower/middle and upper U-NII bands, respectively. FIG. 1 shows an example, in which four carriers having a bandwidth of 20 MHz are used, in the lower side thereof. As described above, since the band has a bandwidth of 30 MHz at both edges thereof, the total bandwidth corresponds to 100 MHz.

In the example of FIG. 1 and Equation 2, through efficiency of 84% may be acquired in an ideal condition in which a transmission terminal is close to a reception terminal, there is no obstacle therebetween, and a station is stopped. In an actual wireless environment, however, a station or objects around the station may move, and obstacles may, exist. Therefore, signals may be attenuated or distorted. That is, a signal delay effect in which a transmitted signal is reflected from the surrounding objects and then inputted to the reception terminal through multiple paths may be accompanied. In this case, interference between symbols may occur.

Furthermore, when the transmission terminal is remote from the reception terminal, the signal may not be discriminated from noise due to the signal attenuation depending on the distance therebetween. When the reception terminal successfully restores the signal, a MAC controller of the terminal generates an acknowledge signal to inform the transmission terminal that the signal has been successfully received. When the transmission terminal does not receive an acknowledge signal from the reception terminal, the transmission terminal determines that the signal transmission has failed, acquires a retransmission opportunity according to the CSMA/CA protocol, and retransmits the signal. As one of system requirements defined in the IEEE 802.11n standard, a MAC throughput is 100 Mbps. Therefore, throughput efficiency of 37% corresponds to a normal value, and the throughput efficiency of 84% corresponds to throughput efficiency which is a theoretical limit and may be obtained in an ideal condition.

That is, the MAC throughput may differ depending on channel states. When the channel state is poor, a packet error frequently occurs, and the retransmission number increases. Then, the throughput efficiency is degraded as much by overheads caused by an acknowledge signal transmission time and an interframe space (IFS).

Figure 2:
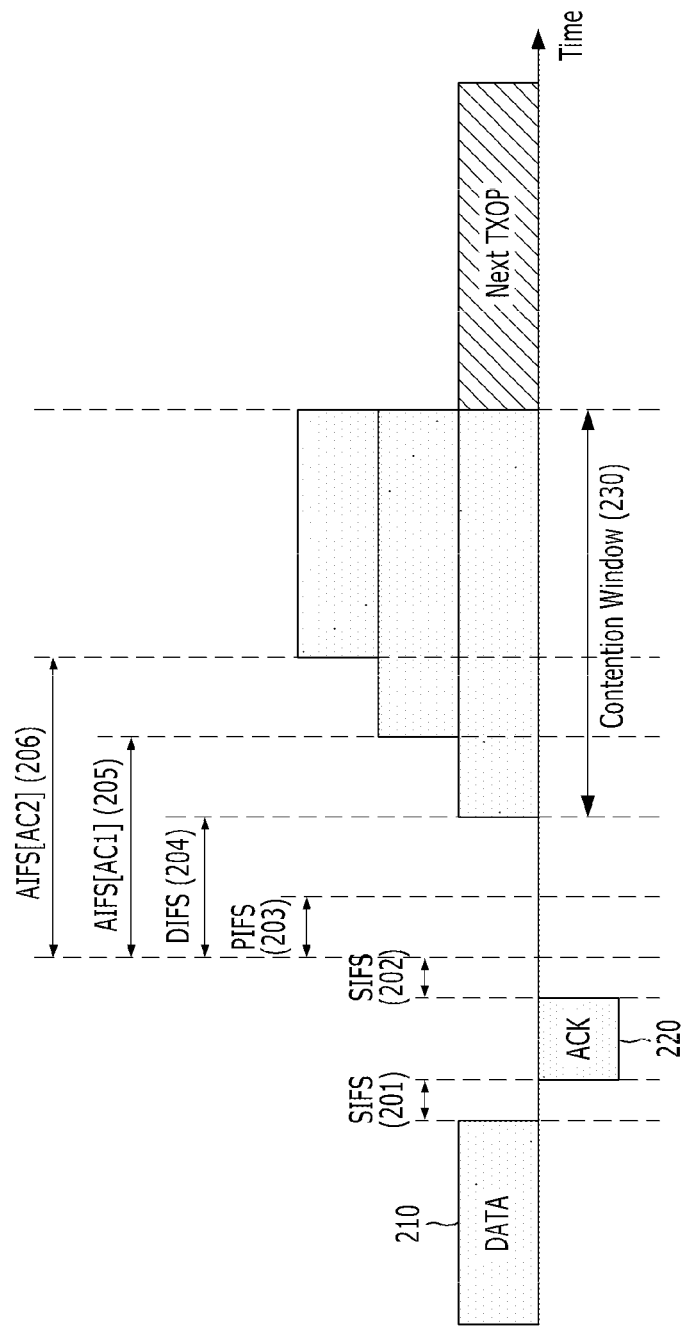
FIG. 2 is a diagram showing a packet transmission protocol of the WLAN standard and overheads according to the packet transmission protocol.

FIG. 2 is a diagram showing a packet transmission protocol of the WLAN standard and an overhead according to the packet transmission protocol.

In FIG. 2, when data 210 is transmitted, an acknowledge (ACK) signal 220 corresponding to the data 210 is transmitted after a short interframe space (SFIS) 201 which is a predetermined short interframe time value. Even when the ACK signal 220 is transmitted, a time corresponding to an SIFS 202 which is a minimum value for a next transmission needs to pass. After that, transmission is performed after a PCF interframe space (PIFS) 203, a DCF interframe space (DIFS) 204, an arbitration interframe space (AIFS[AC1]) 205, or an AIFS[AC2] 206. At this time, the time after the DIFS 204, the AIFS[AC1] 205, or the AIFS[AC2] 206 may include a contention window 230.

As described above, the time periods 201 to 206 occurring after the transmission of the respective data may serve as overheads which degrade the efficiency of the data transmission.

When an access point takes charge of a plurality of stations, channel states between the access point and the stations may differ depending on the positions of the stations and the surrounding environments such as interference caused by another wireless equipment, an obstacle, and refraction and reflection of waves. In the WLAN standard, however, the stations may acquire a transmission opportunity according to their own backoff algorithm, without considering the differential channel environments between the access point and the stations.

Figure 3:
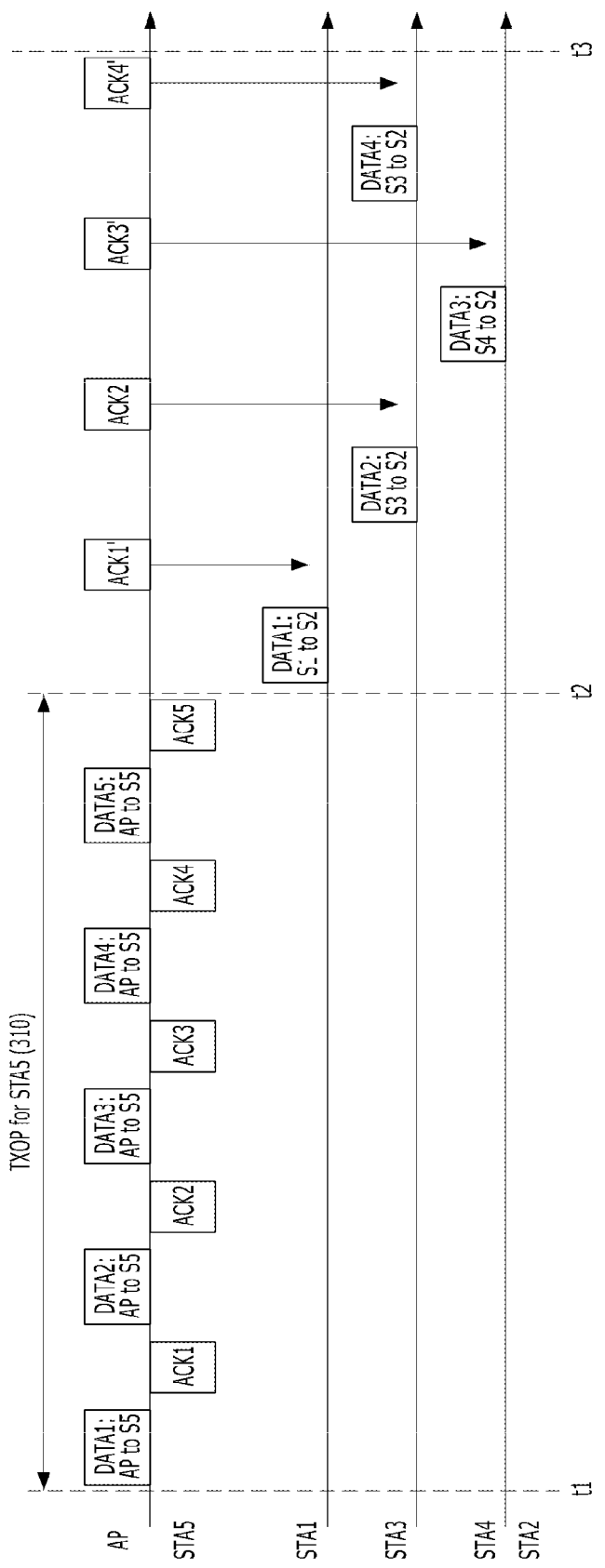
FIGS. 3 and 4 are timing diagrams showing a channel use method among an AP and five stations, in which a transmission opportunity is acquired according to the WLAN technology.
Figure 4:
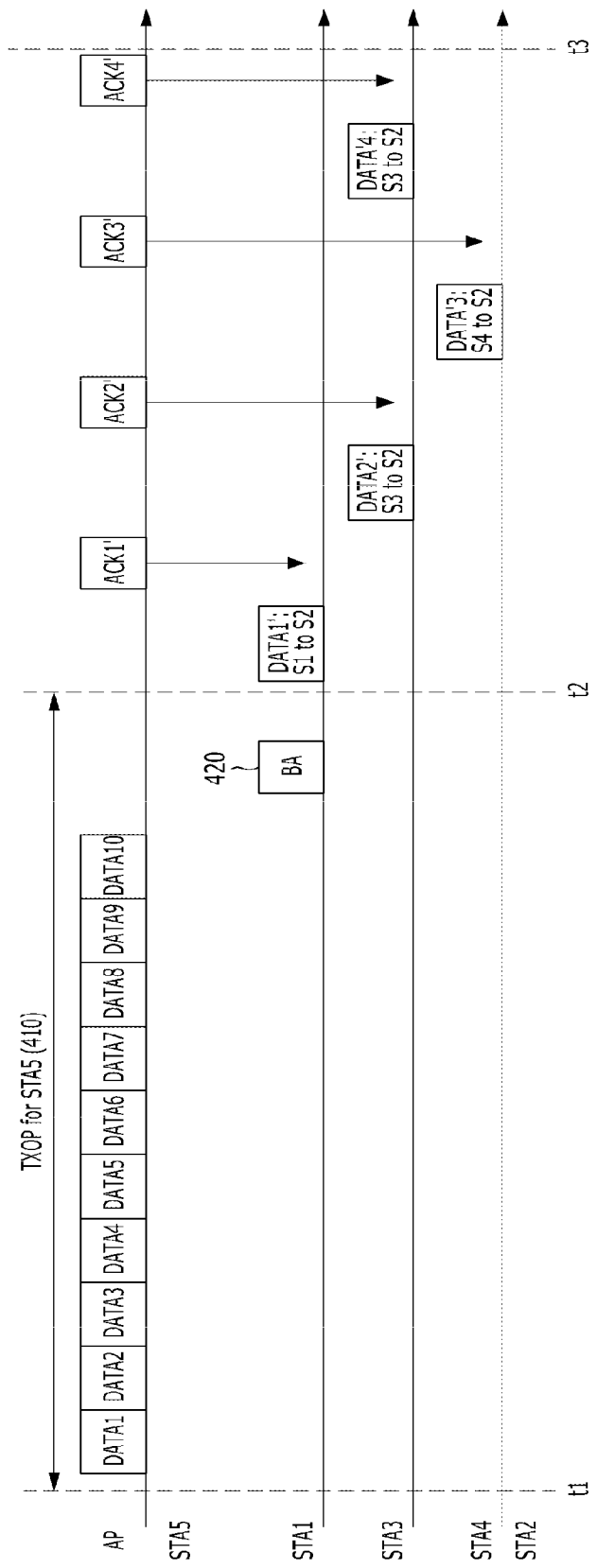

FIGS. 3 and 4 are timing diagrams showing a channel use method among an AP and five stations, in which a transmission opportunity is acquired according to the WLAN technology.

While a station STA5 occupies a channel from time t1 to t2, that is, during a transmission opportunity (TXOP) period 310 or 410 of the station STA5, stations STA1 to STA4 should wait until the channel occupation of the station 5 is terminated. FIG. 3 shows a case in which the station 5 waits for an ACK signal after each data (frame) is transmitted. FIG. 4 shows a case in which the station 5 aggregates data from first data (frame) to tenth data (frame) and then transmits the aggregated data. Therefore, in FIG. 4, a block acknowledge (BA) signal 420 is transmitted with respect to the aggregated and transmitted data.

Furthermore, when one station occupies the channel after time t2, the other stations should be in a standby state. Regardless of the channel states, all the stations contend with each other to acquire a transmission opportunity and then transmit data.

In short, the WLAN technology which is currently used is not effective. The reason may be described as follows.

First, when an access point and one station communicate with each other through the CSMA/CA protocol, the other stations should be in a standby state until the transmission opportunity period of the terminal occupying a channel is terminated.

Second, transmission and reception performances of the stations and environments around the stations are different from one another. However, the WLAN technology adopts a method in which the stations contend with each other to acquire a transmission opportunity according to the CSMA/CA protocol, without considering the differences.

Third, the throughput efficiency is degraded by overheads caused by a backoff time for transmitting a short packet sporadically, an IFS, and a packet header.

Hereafter, the exemplary embodiments of the present invention which will be described below disclose a data transmission apparatus and method in a wireless communication system in which a transmission opportunity is acquired through the contention-based CSMA/CA protocol.

In the wireless communication system in accordance with the embodiment of the present invention, while a specific station transmits data, stations which did not acquire a transmission opportunity transmit data to a station which is of the greatest advantage in acquiring, a next transmission opportunity or an arbitrary station, among a station having a favorable channel state with the access point, a station having a large amount of data to be transmitted, and a station which did not acquire a transmission opportunity, by using an adjacent channel which is not used at that time. After that, when the channel occupation of the specific station is terminated, a station having a favorable channel state acquires a channel occupation priority.

While a specific station Communicates with the access point through a specific channel in a BSS, the other stations perform communication by using the remaining frequency channels. That is, when the specific station communicates with the access point in the BSS, the network is set in an optimal state in order to effectively use the channel in a next transmission opportunity. Furthermore, short packets transmitted by the plurality of stations through the remaining channels are aggregated and then transmitted to the access point through a channel having an excellent state. Using such a method, it is possible to improve the overall throughput and the frequency use efficiency.

Now, the embodiments of the present invention will be described in more detail.

The embodiments of the present invention disclose a data transmission apparatus and method for improving a network throughput and a wireless communication station thereof. The embodiments of the present invention may include the following individual components which may be used as independent methods and apparatuses.

Figure 5:
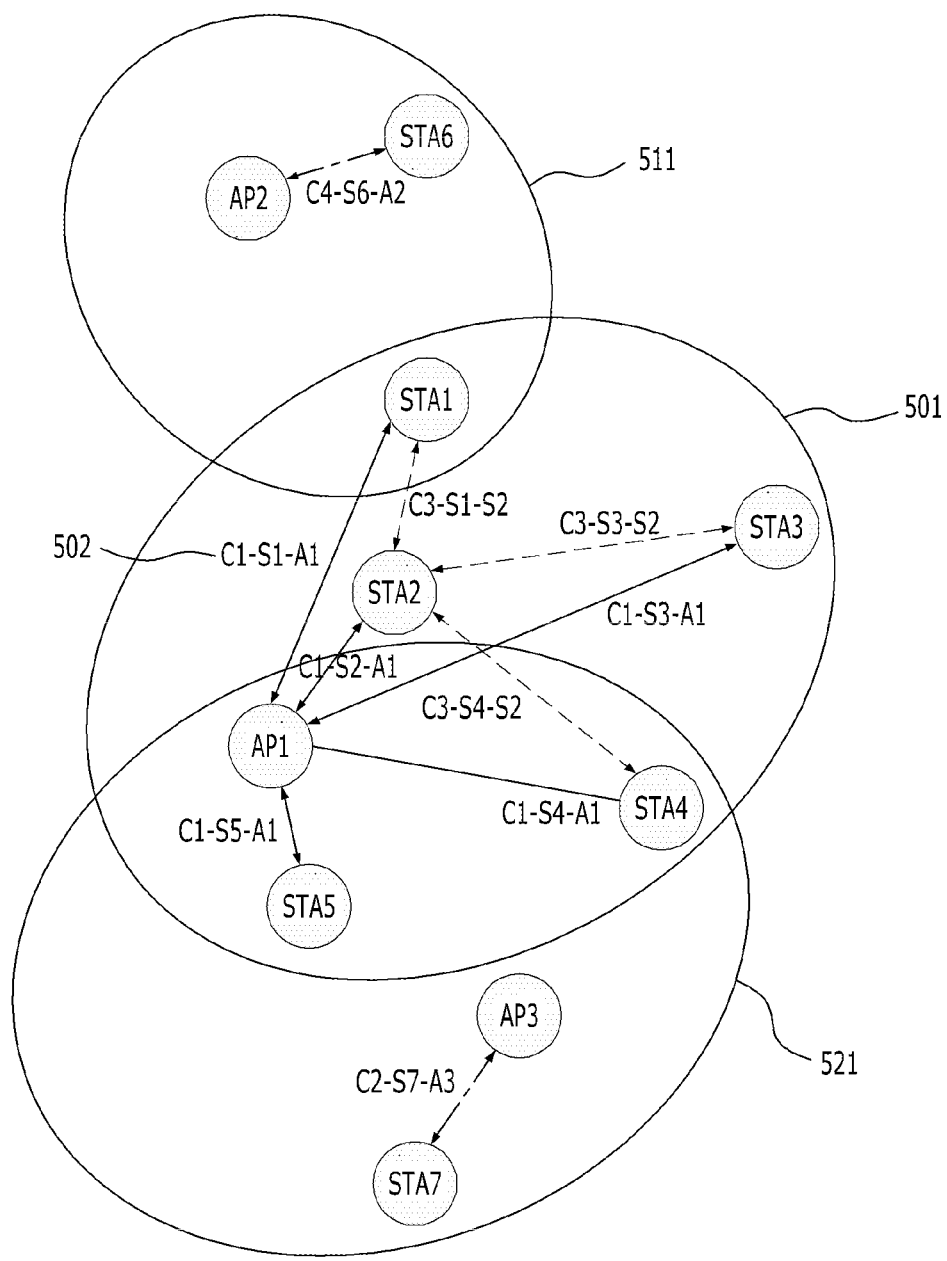
FIG. 5 is a diagram showing a network configuration in accordance with an embodiment of the present invention.

First, a method for overcoming a disadvantage of the CSMA/CA protocol by using an idle frequency and a control apparatus Second, throughput improvement by the aggregation of short packets from a plurality of stations Third, a relay transmission method through a station which is of great advantage in transmission or an arbitrary station among a station having an excellent link performance with the access point, a station having a large amount of data to be transmitted, and a station which did not acquire a transmission opportunity, and a control apparatus Fourth, a transmission method through relay without considering connection state information (channel information) when using the relay transmission method, and a control apparatus Fifth, a signal and protocol for sharing channel information Sixth, a method and apparatus including a combination of two or more components in the respective cases Seventh, a method for selecting the method in accordance with the embodiment of the present invention or the conventional method depending on the length of a transmission opportunity period, and a control apparatus FIG. 5 is a diagram showing a network configuration in accordance with the embodiment of the present invention.

Referring to FIG. 5, when a station STA5 occupies a channel according to the existing CSMA/CA protocol, stations STA1, STA3, and STA4 transmit data to a station STA2 which statistically has the most favorable channel state with an access point AP1, by using a channel 3 which is not used while the station STA5 uses the channel 1. When the channel occupation of the station STA5 is terminated, a long transmission opportunity corresponding to the length of packets to be transmitted by the stations STA1, STA3, and STA4 is preferentially given to the station STA2. Accordingly, the channel resource use efficiency is improved. The reason may be described as follows.

(1) While a specific station communicates with the access point, stations which did not occupy the channel transmit data to a destination station by using an adjacent channel which is not used. At this time, the destination station, to which the stations which did not occupy the channel transmit data by using the adjacent channel which is not used, may include a station having an excellent link performance with the access point, a station having a large amount of data to be transmitted, and a station which is of great advantage in transmission Among the terminals which did not acquire a transmission opportunity. In addition to the above-described stations, communication between stations may be performed, if necessary.

(2) A terminal which is statistically advantageous in transmission has a next transmission opportunity, in the case of a terminal having an excellent link performance with the access point or a terminal having a large amount of data to be transmitted. Therefore, the retransmission rate is reduced to improve the overall throughput.

(3) The backoff time for channel occupation contention, the IFS, and the packet header overhead may be reduced.

(4) Packets which were scheduled to be transmitted by a plurality of stations are aggregated to minimize the protocol and packet overhead, and the terminal having an excellent link performance with the access point transmits the aggregated packet. Therefore, it is possible to improve the network throughput.

In FIG. 5, basic service sets (BSS) determined by the respective access points AP1 to AP3 are discriminated and represented by reference numerals 501, 511, and 521. Furthermore, the communications between the respective stations and the access points or the communications between the stations are indicated by two-way arrows. The communications will be described as follows.

In FIG. 5, a symbol CX-SY-AZ on a two-way arrow represents an example in which a station Y communicates with an access point Z through a channel X. For example, a relation indicated by reference numeral 502 is represented by C1-S1-A1. This example means that the station (STA1) S1 communicates with the access point (AP1) A1 through the channel C1.

Therefore, the BSS 501 of the access point AP1 shown in FIG. 5 utilizes two channels C1 and C3 at the same time. That is, when the station STA5 acquires a transmission opportunity to occupy the channel C1, the terminals STA1, STA3, and STA4 use the channel C3 to relay data to the terminal STA2 which is of the greatest advantage in acquiring a next transmission opportunity.

Figure 6:
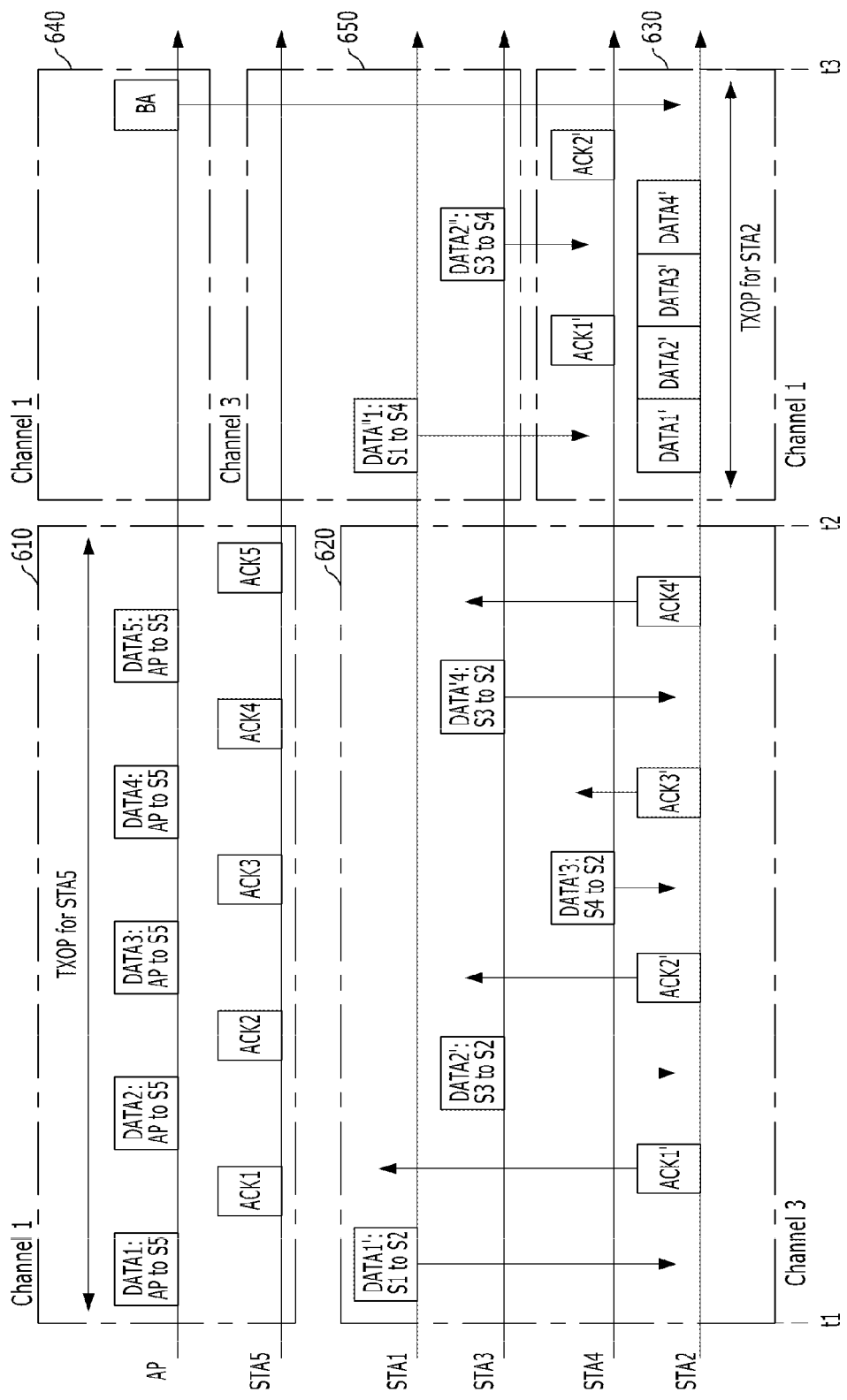
FIGS. 6 and 7 are diagrams showing an example of channel utilization in accordance with the embodiment of the present invention.
Figure 7:
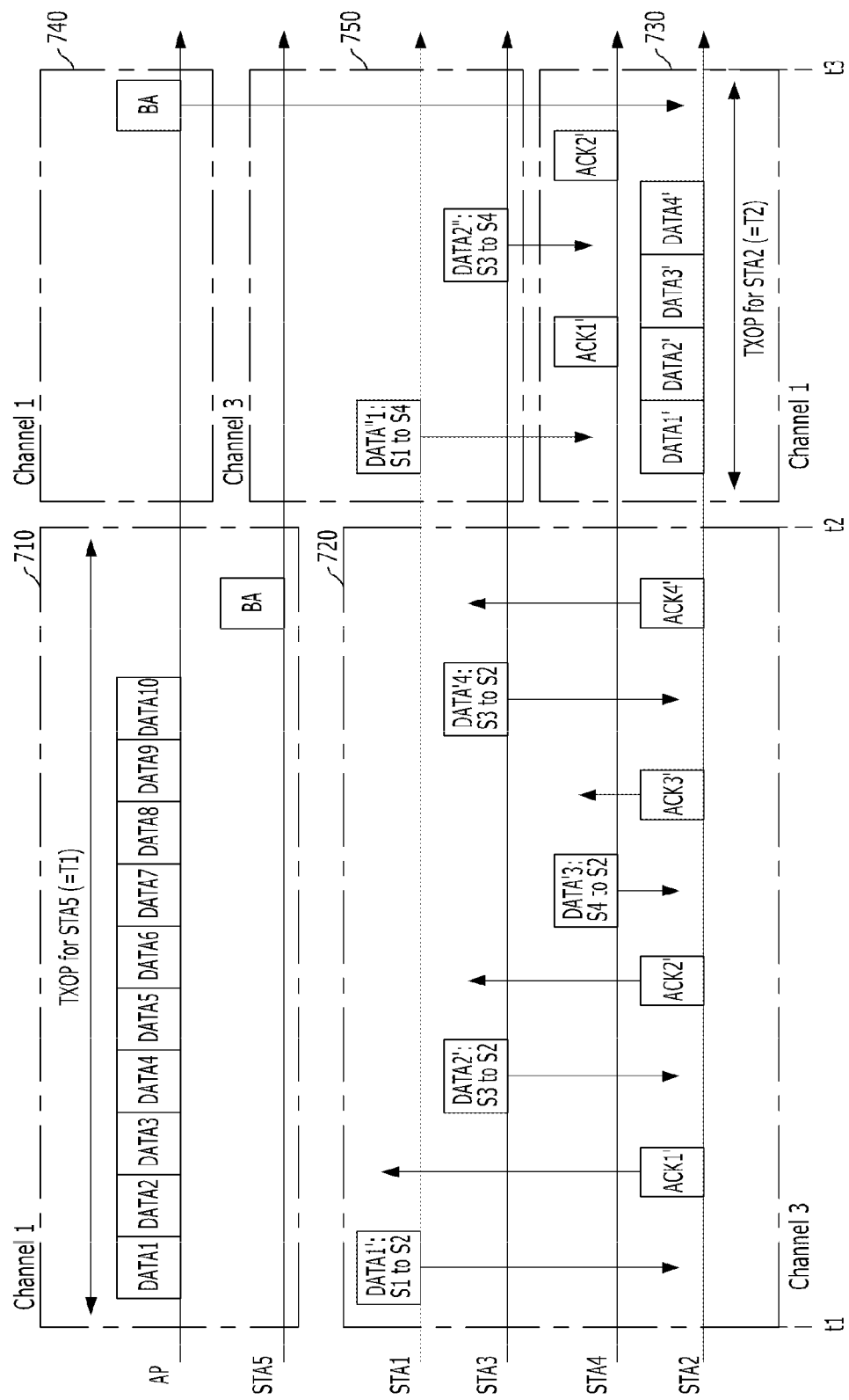

FIGS. 6 and 7 are diagrams showing an example of channel utilization in accordance with the embodiment of the present invention.

FIGS. 6 and 7 shows an example in which data are transmitted in such a manner as described in FIG. 5 in the cases of FIGS. 3 and 4. In FIG. 6, reference numeral 610 indicates a case in which communication is performed between the station STA5 and the access point AP through the channel 1 as shown in FIG. 3. In this case, data frame is transmitted one by one, and an ACK signal corresponding to each data frame is received. In FIG. 7, reference numeral 710 indicates a case in which the station 5 transmits aggregated data frame. In the conventional method as indicated by reference numeral 610 or 710, even when one station occupies only the channel 1, the other stations should wait before they acquire the channel through a next contention period.

In this embodiment of the present invention, however, the communications among the other terminals may be performed in such a manner as indicated by reference numeral 620 or 720. At this time, the communications may include a case in which a station transmits data to another station or a case in which a station transmits data to another station which is of great advantage in communicating with the access point, such that the data is relayed. FIGS. 6 and 7 show a case in which data is transmitted to another terminal which is of great advantage in communicating with the access point, for example, the station STA2.

When the data are transmitted to the station STA2, a channel between the terminal STA2 and the access point is formed through a contention or a predetermined form in a period in which the data is transmitted to a next upward link, and the station STA2 may transmit data to the access point through the selected channel, for example, a channel 3. At this time, the station STA2 may aggregate the data received from other stations and then transmit the aggregated data. Furthermore, the access point informs the station STA2 of the result of the data received from the station STA2 through a BA signal. Such a process corresponds to portions indicated by reference numerals 630 and 640 in FIG. 6 and portions indicated by reference numerals 730 and 740 in FIG. 7.

Furthermore, when the communication is performed in such a manner as indicated by reference numerals 630 and 640 of FIG. 6 or reference numerals 730 and 740 of FIG. 7, the communications among other stations may be performed in the same manner as described above. Such a process corresponds to reference numeral 650 in FIG. 6 or reference numeral 750 in FIG. 7.

Hereafter, requirements depending on the above-described processes and the processes will be described in more detail.

(1) The access point stores statistical throughput of the stations communicating with the access point, channel information such as received signal strength, and station information such as the number and length of packets to be transmitted at the next time. Then, the access point informs stations belonging to the BSS of one or more stations which are of advantage in acquiring a next transmission opportunity through a control signal.

(2) The access point informs the stations belonging to the BSS of a channel which is currently used and a channel which is not used among the adjacent channels, by using a control signal.

(3) Each of the stations may buffer the data and addresses of other stations. When the buffer is full, the station uses a control signal such that other stations may wait.

(4) Stations which do not occupy a channel contend with each other to acquire a transmission opportunity in the remaining channels. When the channel information and the station information are shared, data is transmitted to a station having a favorable channel state with the access point in an order of terminals occupying the channels. Furthermore, when the channel information and the station information are not shared, data is transmitted to one station among the terminals which do not acquire a transmission opportunity.

(5) After the channel occupation is terminated, a priority is given to a station to which data packets are relayed and buffered, when a next transmission opportunity is determined. Therefore, the throughput is improved.

(6) The method in accordance with the embodiment of the present invention or the conventional method may be selected.

A. When a station occupying a channel has a large amount of data to be transmitted to the access point or a large amount of data to be received from the access point, a transmission opportunity period between the access point and the station occupying the channel may be given to the station as a value which is longer than a register value which may be changed into a program. In this case, the method in accordance with the embodiment of the present invention may be applied. In the opposite case, however, the conventional method may be applied.

B. The channel occupation period of the station is compared with a threshold value set to a register value which may be programmed into a network allocation vector (NAV). When the channel occupation period is larger than the threshold value, the method in accordance with the embodiment of the present invention is applied.

C. When there is no available adjacent channel because another BSS uses all the channels, the conventional method is applied. However, when one or more available adjacent channels exist, the method in accordance with the embodiment of the present invention is applied.

(7) When a station is determined to be of the greatest advantage in acquiring a next transmission opportunity among the stations which did not occupy a channel, it is determined whether or not the channel state of the station serving as a packet relay point of other stations is suitable for the aggregated packet transmission. In order for such a determination, the channel state value may be compared with a register value which may be changed into a program. When the channel state value is larger than the register value, data is transmitted in the aggregated packet mode. On the other hand, when the channel state value is smaller than the register value, data is transmitted in a normal ACK mode.

Figure 8:
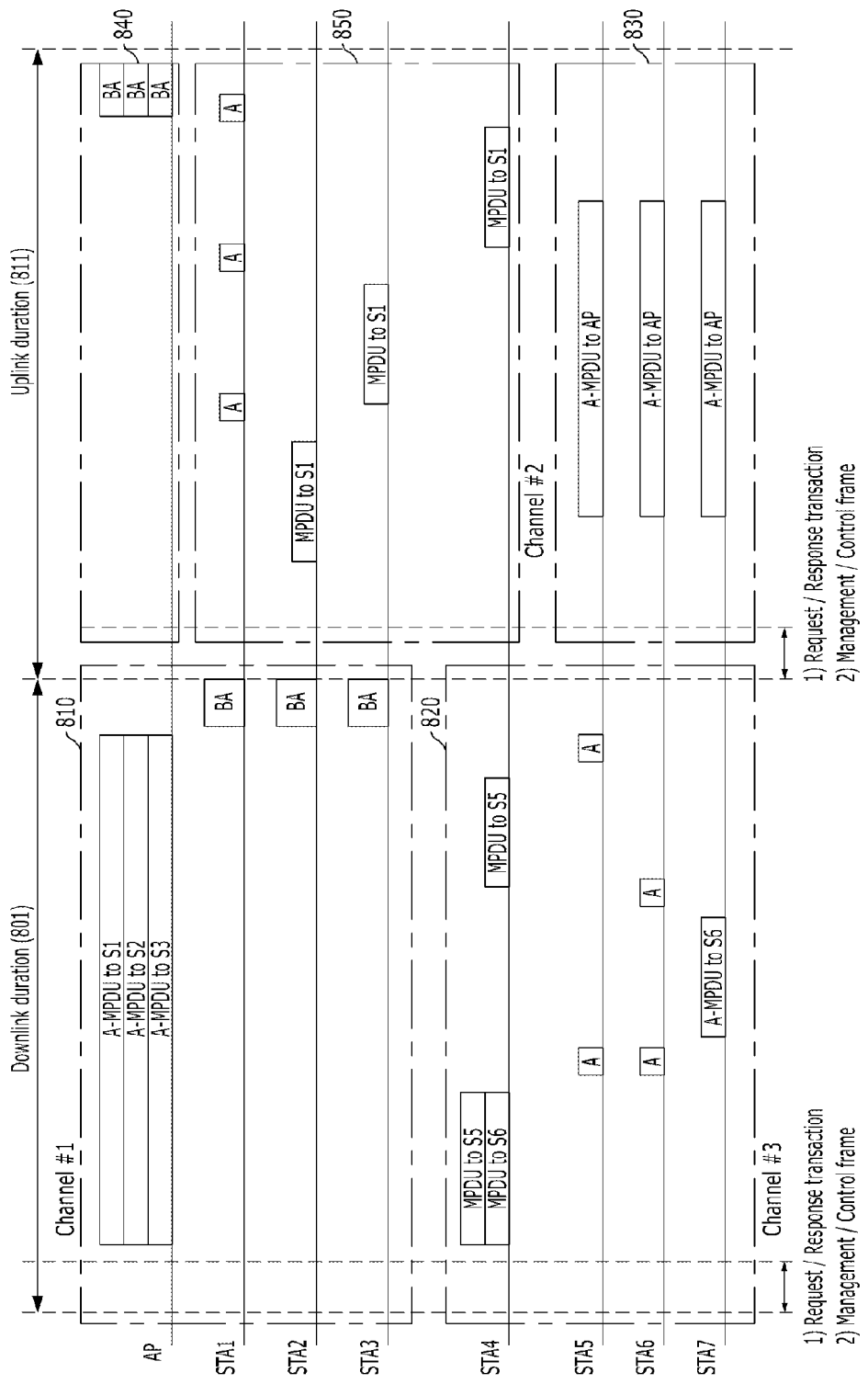
FIG. 8 is a diagram showing a transmission method which is combined with a multi-user MIMO technology to improve throughput.

FIG. 8 is a diagram showing a transmission method which is combined with a multi-user MIMO technology to improve throughput.

In the transmission method in accordance with the embodiment of the present invention, a multi-channel technology, a multi-user MIMO technology, or both of the technologies may be used for high-speed data transmission. In FIG. 8, one BSS includes one access point AP and seven stations. While the access point AP occupies a channel 1 to transmit data to stations STA1 to STA3 by using the multi-user MIMO technology, stations STA4 to STA7 occupy a channel 3, and data is transmitted to the stations STA5 and STA6 which are efficient in transmission when a next transmission opportunity is acquired.

The above-described situations may be described in more detail as follows. During a downlink duration 801, the access point AP transmits data (frame) to the stations STA1 to STA3 through the channel 1 by using the multi-user MIMO technology, as indicated by reference numeral 810. Furthermore, during the same downlink duration 801, that is, during the same time, the terminals STA4 and STA7 transmit data to the stations STA5 and STA6 which are of advantage in acquiring a transmission opportunity at the next time, as indicated by reference numeral 820.

Therefore, when the occupation of the channel 1 between the access point AP and the stations STA1 to STA3 is terminated, the stations STA5 and STA6 immediately preoccupy the channel together with the station STA7. Furthermore, the stations STA5 to STA7 aggregate buffered packets and transmit the aggregated packet to the access point. That is, the stations STA5 to STA7 transmit data to the access point AP through the respective channels, as indicated by reference numeral 830. Then, the results are transmitted to the respective stations through BA signals, as indicated by reference numeral 840.

As described above, the stations STA1 to STA4 which did not occupy the channel during this transmission period may acquire a transmission opportunity at the next time. In this case, data are transmitted to the station STA1 which is efficient in transmission, and the station STA1 buffers the data and prepares to transmit an aggregated packet. That is, during an uplink duration 811, the terminal STA1 receives data from the stations STA2 to STA4, respectively, through the channel 2, as indicated by reference numeral 850. At this time, the station STA1 may transmit acknowledge signals A for the respective data to the corresponding stations.

Figure 9:
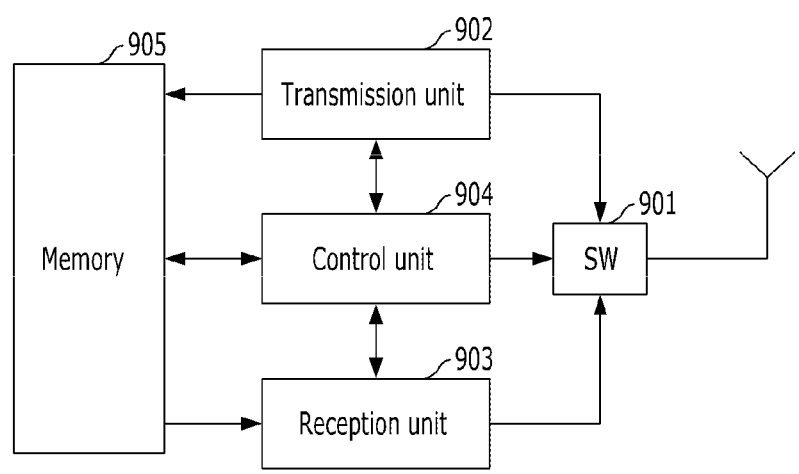
FIG. 9 is a function block diagram of a station capable of performing the method in accordance with the embodiment of the present invention.

FIG. 9 is a function block diagram of a station capable of performing the method in accordance with the embodiment of the present invention.

A switch 901 is configured to receive data from an access point or receive data to be transmitted to the access point from at least one node which does not communicate with the access point. The reception operation of the switch 901 may be controlled by a control unit 904.

The data received by a reception unit 903 is stored in a memory 905. That is, the memory 905 has an area configured to receive data to be transmitted to the access point from at least one node and store the received data. Furthermore, the memory 905 may store information on a node having the most favorable state, which is provided from the access point in accordance with the embodiment of the present invention.

A transmission unit 902 is configured to transmit data which is received from another node and stored in the memory 905 or its own data to the access point. The transmission operation of the transmission unit 902 is controlled by the control unit 904.

The switch 901 connects the reception unit 902 and the transmission unit 902 to an antenna or cut off the connection. Such a switching operation is controlled by the control unit 904.

The control unit 904 is configured to perform a variety of controls for the communication of the station. Furthermore, the control unit 904 controls the reception and storage of the data from a node which does not communicate with the access point. Furthermore, when the communication between a specific node and the access point is terminated, the control unit 904 controls the transmission unit and the reception unit to perform a procedure for the communication with the access point. Then, the control unit 904 controls the transmission unit 902 to transmit the data stored in the memory 905 to the access point.

Furthermore, when data to be transmitted to the access point exists, another node is communicating with the access point, and at least one or more nodes having a more favorable communication channel with the access point exist, the control unit 904 may select one of the nodes having a more favorable communication channel within the communication time and control the transmission unit 902 to transmit data, which is to be transmitted to the access point, to the selected node.

In the embodiment of the present invention, while a link between an access point and a specific station group is decided for one or more channels which are scheduled to be used by the access point and the stations within one BSS and the specific station group occupies the channel for a predetermined time, stations which did not occupy the channel transmit data to a station group having the most favorable channel state with the access point by using an idle channel. When the channel occupation is terminated, a station group having a favorable channel state acquires a transmission opportunity and transmits data by using a combination or one of the aggregated packet transmission scheme, the multi-user MIMO scheme, and the multi-channel transmission scheme.

While a specific station group occupies a specific channel group, short packets to be transmitted at the next time are relayed to stations having a favorable channel state with the access point through an idle channel, and a next transmission opportunity is preferentially given to the stations. Furthermore, as the packets are aggregated and transmitted by using the multi-channel and multi-user MIMO technology, it is possible to improve throughput.

In the embodiment of the present invention, while a specific station or one or more station groups occupy a channel, channel information for selecting a relay point from stations which did not occupy the channel and an amount of packets to be transmitted at the next time need to be shared by stations within a BSS. For this, the following method and control apparatus may be provided.

Available information may include a signal-to-noise ratio (SNR), a signal-to-interference ratio, received signal strength, a packet error rate, throughput, a list of channels which stations may access, and a buffered data amount. In order that the information may be effectively shared in the CSMA/CA protocol, request to send (RTS) and clear to send (CTS) signals or a sounding request packet and a sounding reply packet may be utilized. For example, in the conventional method, reserved information fields or data fields of the RTS and CTS signals, the sounding request packet, and the sounding reply packet are not used. In the embodiment of the present invention, however, the reserved information fields or data fields may be used to maintain compatibility.

The information sharing method in accordance with the embodiment of the present invention includes an operation of coding (or indexing) information in a control packet for sharing the channel and station information. When this operation is used, the length of the data field may be reduced, and a large amount of information may be contained and transmitted at the same time. In order to share the channel and station information, the apparatus in accordance with the embodiment of the present invention uses a protocol scheme which is divided into an information transmission process and an information sharing process.

(1) Method for expanding signal fields of RTS and CTS signals, a sounding request packet, and a sounding replay packet—RTS and CTS packets for transmitting high-speed WLAN mode packets are defined, and channel and station information may be transmitted.

(2) Utilization of data fields of the RTS and CTS signals—since the data fields of the RTS and CTS signals are not utilized in the conventional WLAN scheme, the protocol scheme including the information transmission process and the information sharing process are used for stations within a BBS to share the channel and station information.

a) Information transmission process: a station which is to transmit data transfers the channel and station information as an index or code to the data field, when transmitting an RTS packet. The access point receiving the RTS packet stores a channel or station state value corresponding to the index or code of the data field.

b) Information sharing process: the access point receiving the RTS packet transfers link performances of the respective stations, which have been collected so far, as indexes or codes to the data field of the CTS packet. The respective stations receiving the RTS packet utilize a value corresponding to the channel or station information index or code of the data field to improve the link performance of a next transmission packet.

(3) Utilization of the sounding request packet and the sounding reply packet a) For the sounding request packet of the access point, a station transfers the channel and station information as an index or code to a sounding replay packet information field, and the access point stores the statistical channel information and station information of the respective stations. The channel and station information may include a signal-to-noise ratio, a signal-to-interference ratio, received signal strength, a packet error rate, throughput, a list of channels which the stations may access, and an amount of buffered data as well as a precode matrix.

b) The access point contains the channel and station information in the information field, in order to inform the stations within the BSS of the statistical link performances of the respective terminals which have been stored so far, and then transmits the sounding request packet. Furthermore, all the stations analyze and store the channel and station information of the sounding request packet. Only the stations receiving the sounding request packet may reply.

When a transmission signal of a specific station within a BSS suffers a path loss caused by the channel such that the receive sensitivity thereof does not reach that of another station, a hidden node problem may occur. In order to minimize the hidden node problem, the method in accordance with the embodiment of the present invention includes an operation of transmitting RTS and CTS packets at the maximum power, when an idle channel list is shared and an idle channel is used, such that another station does not approach the occupied channel. Although the RTS and CTS packets are transmitted at the maximum power, a signal collision problem may be caused by a hidden node which occurs due to the limit of the radio field intensity. The signal collision problem may occur in the conventional WLAN technology as well as in the embodiment of the present invention.

The apparatus and method in accordance with the embodiment of the present invention may be applied to a wireless communication environment in which the 2.4 GHz range, the 5 GHz range, the 60 GHz range for WLAN, or a combination of two or more of the 2.4 GHz range, the 5 GHz range, and the 60 GHz range is used, or an another high-frequency band which is used by another wireless communication standard.

The channel information is very effectively utilized in a single band. However, in order to utilize an idle channel across the bands, frequent channel use and channel information sharing operations for the respective bands are required.

The apparatus in accordance with the embodiment of the present invention may be utilized in a dual mode with a station having an ad-hoc mode function.

In accordance with the embodiment of the present invention, data may be continuously transmitted to a station which statistically has the most favorable channel state with the access point through a channel which is not used while a specific station occupies a channel. When the channel occupation is terminated, the station having a favorable channel state preferentially obtains a transmission opportunity, aggregates buffered data, and transmits the aggregated data to the access point. The series of operations may increase the channel use efficiency, which makes it possible to increase the throughput.

Referring to FIGS. 4 and 7, results obtained by comparing the conventional method and the method in accordance with the embodiment of the present invention will be described as follows. To facilitate the understanding in the embodiment of the present invention, it is assumed that the channel 1 between the access point AP and the stations STA1, STA3, and STA4 has an SNR of 15 dB, and the channel 3 between the access point AP and the station STA2 or STA5 has an SNR of 28 dB. Furthermore, it is assumed that the stations operate in the multi-antenna mode in which they uses a bandwidth of 40 MHz to obtain the maximum throughput. At this time, a maximum aggregated packet length may correspond to 50,000 byte. In the case of a normal reply packet mode, a data packet length is assumed to correspond to 2,000 byte. According to Table 1, the WLAN operates in an MCS10 mode having a data rate of 81 Mbps in the case of the SNR of 15 dB, and operates in an MCS15 mode having a data rate of 270 Mbps in the case of the SNR of 28 dB, depending on the standards or the link adaption algorithms of manufactures.

Table 1 shows 40 MHz-mode data rates and required SNRs through a 2×2 antenna configuration according to the IEEE 802.11n standard.

TABLE 1

| MCS index | Modulation | R | Data rate [Mbps] | Required SNR [dB] |
|---|---|---|---|---|
| 8 | BPSK | ½ | 27 | 8 |
| 9 | QPSK | ½ | 54 | 11 |
| 10 | QPSK | ¾ | 81 | 14 |
| 11 | 16-QAM | ½ | 108 | 16 |
| 12 | 16-QAM | ¾ | 162 | 20 |
| 13 | 64-QAM | ⅔ | 216 | 23 |
| 14 | 63-QAM | ¾ | 243 | 25 |
| 15 | 64-QAM | ⅚ | 270 | 27 |

(1) The channel use efficiency for the 40/80 MHz bandwidths in the conventional method may be expressed as Equation 3 below.

$$MAC \text{ throughput} = \begin{cases} \dfrac{50000 \times S}{1764} = 227 \text{ Mbps for } t < t_2 \\ \dfrac{2000 \times S}{480} = 33 \text{ Mbps for } t_2 < t < t_3 \end{cases} \quad \text{Eq. 3}$$

$$MAC \text{ throughput efficiency} = \begin{cases} \dfrac{227 \text{ Mbps}}{270 \text{ Mbps}} = 84\% \text{ for } t < t_2 \\ \dfrac{33 \text{ Mbps}}{81 \text{ Mbps}} = 41\% \text{ for } t_2 < t < t_3 \end{cases}$$

$MAC \text{ Spectral efficiency over 2 channel} =$ $$\begin{cases} \dfrac{227 \text{ Mbps}}{20 \times 2 \text{ MHz}} = 5.68 \text{ bps/Hz for } t < t_2 \\ \dfrac{33 \text{ Mbps}}{20 \times 2 \text{ MHz}} = 0.83 \text{ bps/Hz for } t_2 < t < t_3 \end{cases}$$

$MAC \text{ Spectral efficiency over 4 channel} =$ $$\begin{cases} \dfrac{227 \text{ Mbps}}{20 \times 4 \text{ MHz}} = 2.84 \text{ bps/Hz for } t < t_2 \\ \dfrac{33 \text{ Mbps}}{20 \times 4 \text{ MHz}} = 0.41 \text{ bps/Hz for } t_2 < t < t_3 \end{cases}$$

(2) The channel use efficiency for the 40/80 MHz bandwidths in the method in accordance with the embodiment of the present invention may be expressed as Equation 4 below.

$$MAC \text{ throughput} = \dfrac{50000 \times 8}{1764} = 227 \text{ Mbps} \quad \text{Eq. 4}$$

$$MAC \text{ throughput efficiency} = \dfrac{227 \text{ Mbps}}{270 \text{ Mbps}} = 84\%$$

$$MAC \text{ Spectral efficiency over 2 channel} = \dfrac{227 \text{ Mbps}}{20 \times 2 \text{ MHz}}$$
$$= 5.68 \text{ bps/Hz}$$

$$MAC \text{ Spectral efficiency over 4 channel} = \dfrac{227 \text{ Mbps}}{20 \times 4 \text{ MHz}}$$
$$= 2.84 \text{ bps/Hz}$$

In accordance with the embodiment of the present invention, while the station STA5 occupies the channel 1, the stations STA1, STA3, and STA4 which did not occupy the channel 1 transmit data to the station STA2 having the most favorable channel state with the access point AP through the channel 3. Then, after the channel occupation of the station 5 is terminated, the station 2 preferentially occupies the channel, and then transmits packets in the aggregated packet mode having an excellent performance when the channel state thereof is favorable. Therefore, it is possible to improve the entire channel use efficiency.

The method and apparatus in accordance with the embodiment of the present invention employs the hybrid CSMA/CA scheme. When a specific station occupies a channel for a long time, stations which did not occupy the channel transmit data to a station which has excellent transmission efficiency when acquiring a next transmission opportunity, for example, a station having an excellent link performance with the access point or a station having a large amount of data to be transmitted at the next time, or an arbitrary station, by using an idle channel which is not used. The station receiving the data preferentially acquires a next transmission opportunity. Therefore, it is possible to improve the overall throughput and the frequency efficiency.

When the method and apparatus in accordance with the embodiment of the present invention is applied, it is possible to increase the throughput, the channel/frequency use efficiency, and the network efficiency in the wireless communication system in which the stations acquire a transmission opportunity according to the CSMA/CA protocol.

While the present invention has been described with respect to the specific embodiments, it will be apparent to those skilled in the art that various changes and modifications may be made without departing from the spirit and scope of the invention as defined in the following claims.

What is claimed is:

1. A data communication method in a basic service set (BSS) of a wireless communication system using a carrier sense multiple access with collision avoidance (CSMA/CA) protocol, the data communication method comprising:
performing, by first and second nodes within the BSS, communication within a predetermined first time period; and
transmitting, by a third node within the BSS, data to a fourth node within the first time period through a channel which is not used by the other nodes,
wherein the first node comprises an access point, and
wherein the third node selects the fourth node among one or more nodes except the first and second nodes in the BSS based on channel state information between the access point and the one or more nodes of which the access point previously informs the third node, the one or more nodes having more favorable channel states than that of the third node.

2. The data communication method of claim 1, wherein when the communication between the access point and the second node is terminated, the fourth node sets a channel with the access point, and then transmits the data received from the third node to the access point.

3. A data transmission method in a BSS of a wireless communication system using a CSMA/CA protocol, the data transmission method comprising:
performing, by first and second nodes within the BSS, communication within a predetermined first time period; and
receiving, by a third node within the BSS, data from a fourth node within the first time period through a channel which is not used by the other nodes, and storing the received data,
wherein the first node comprises an access point, and
wherein the fourth node selects the third node among one or more nodes except the first and second nodes in the BSS based on channel state information between the access point and the one or more nodes, the one or more nodes having more favorable channel states than that of the fourth node.

4. The data transmission method of claim 3, wherein the third node is configured to set a channel for communicating with the access point at the next predetermined time period, and transmit the data received from the fourth node to the access point.

5. The data transmission method of claim 4, wherein the third node is configured to further receive data from nodes other than the fourth node within the first time period, and transmit the received data together with the data received from the fourth node to the access point.

6. The data transmission method of claim 4, wherein the third node is configured to add an address of the fourth node to the data received from the fourth node, and transmit the data including the address to the access point.

7. The data transmission method of claim 3, wherein the channel state information between the access point and the one or more nodes is previously supplied from the access point to the fourth node.

8. A data communication apparatus, which uses a CSMA/CA protocol, in a target node belonging to a BSS, the data communication apparatus comprising:
a reception unit configured to receive data to be transmitted to an access point from at least one node which does not communicate with the access point within a predetermined first time period;
a memory configured to store the received data;
a transmission unit configured to transmit the data received from the at least one node to the access point within the next predetermined time period; and
a control unit configured to control the data reception from the at least one node, control the transmission unit and the reception unit to perform a procedure for communicating with the access point when communication between a specific node and the access point within the predetermined first time period is terminated, and control the transmission unit to transmit the data stored in the memory to the access point within the next predetermined time period,
wherein the at least one node selects the target node, among one or more nodes in the BSS except a node that communicates with the access point within the predetermined first time period, as a node to which the at least one node transmits data, based on channel state information between the access point and the one or more nodes, the one or more nodes having more favorable channel states than that of the at least one node.

9. The data communication apparatus of claim 8, wherein the memory further stores the channel state information between the access point and the other nodes.

10. The data communication apparatus of claim 9, wherein the channel state information is shared by a channel state information reply frame and a channel state information request frame.

11. The data communication apparatus of claim 8, wherein when the data stored in the memory has been received from the at least one node, the control unit is configured to control the transmission unit to aggregate the respective data and transmit the aggregated data to the access point.

12. A data communication apparatus, which uses a CSMA/CA protocol, in a target node belonging to a BSS, the data communication apparatus comprising:
a memory configured to store data and channel state information between an access point and the target node;
a transmission unit configured to transmit the data stored in the memory; and
a control unit configured to select a node among one or more nodes except the target node in the BSS based on channel state information between the access point and the one or more nodes, the one or more nodes having more favorable channel states than that of the target node, and control the transmission unit to transmit the data stored in the memory to the selected node,
wherein when the data stored in the memory is transmitted to the selected node, the control unit is configured to control the transmission unit to transmit the data within a predetermined time period during which the access point and a specific node communicate with each other.

* * * * *